United States Patent
Kim

(10) Patent No.: US 8,795,087 B2
(45) Date of Patent: Aug. 5, 2014

(54) LOAD BALANCING IN CLOUD-BASED GAME SYSTEM

(75) Inventor: Seungil Kim, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/636,801

(22) PCT Filed: Feb. 14, 2012

(86) PCT No.: PCT/US2012/024995
§ 371 (c)(1),
(2), (4) Date: Sep. 24, 2012

(87) PCT Pub. No.: WO2013/122572
PCT Pub. Date: Aug. 22, 2013

(65) Prior Publication Data
US 2013/0210526 A1    Aug. 15, 2013

(51) Int. Cl.
*G06F 17/00*    (2006.01)
(52) U.S. Cl.
USPC ........................................................... 463/42
(58) Field of Classification Search
USPC ............................... 463/40–42; 709/217–219
See application file for complete search history.

(56) References Cited

U.S. PATENT DOCUMENTS

| | | | |
|---|---|---|---|
| 6,560,717 B1 | 5/2003 | Scott et al. | |
| 7,868,891 B2 | 1/2011 | Wexler | |
| 8,359,361 B2* | 1/2013 | Thornton et al. | 709/206 |
| 8,543,582 B1* | 9/2013 | Granstrom | 707/748 |
| 2007/0061202 A1 | 3/2007 | Ellis et al. | |
| 2009/0253487 A1 | 10/2009 | Gagner et al. | |
| 2010/0105454 A1 | 4/2010 | Weber et al. | |
| 2010/0271375 A1 | 10/2010 | Diard | |
| 2011/0087960 A1 | 4/2011 | Tabone et al. | |
| 2011/0088071 A1 | 4/2011 | Yerli | |
| 2011/0119293 A1* | 5/2011 | Taylor et al. | 707/769 |

OTHER PUBLICATIONS

S. Ahmad, et al., "The Community Network Game Project: Enhancing Collaborative Activities in Online Games", 6 pages.
International Search Report and Written Opinion from International Application No. PCT/US2012/024995 mailed May 29, 2012.

* cited by examiner

*Primary Examiner* — Ronald Laneau
(74) *Attorney, Agent, or Firm* — Brundidge & Stanger, P.C.

(57) ABSTRACT

Technologies are generally described for a load balancing scheme for a cloud-based game system. In some examples, a load balancing system may include a resource usage measurement unit configured to measure resource usage of a game server, a determination unit configured to determine one or more client devices to stream non-interactive media files among a plurality of client devices connected to the game server based at least in part on the resource usage measured by the resource usage measurement unit, and a transmission unit to stream the non-interactive media files to one or more of the client devices upon occurrence of a predetermined game event.

29 Claims, 5 Drawing Sheets

LOAD BALANCING IN CLOUD-BASED GAME SYSTEM

BACKGROUND

The birth of cloud computing technology and the dissemination of high-end electronic devices such as smartphones, tablets and digital televisions have been enticing users to enjoy high-quality games with their devices. In the cloud-based environment, a game server with high-performance (e.g., with high processing power) may run or execute a high-quality game application, and provide a game service to multiple user devices connected to the game server. In such cases, users may enjoy the game with their user devices, which may not have enough processing power to run the high-quality game application. However, when massive numbers of users access to the game server simultaneously, the server may run short of processing power to provide the expected high-performance to each of the user devices.

SUMMARY

In an example, a load balancing system may include a resource usage measurement unit configured to measure resource usage of a game server, a determination unit configured to determine one or more client devices to stream non-interactive media files among multiple client devices connected to the game server based at least in part on the resource usage measured by the resource usage measurement unit, and a transmission unit to stream the non-interactive media files to one or more of the client devices upon occurrence of a predetermined game event.

In another example, a method performed under control of a game server may include measuring resource usage of the game server, comparing the measured resource usage with a predetermined threshold, determining, among multiple client devices connected to the game server, one or more candidate client devices in each of which a predetermined game event is about to happen when the measured resource usage exceeds the predetermined threshold, and streaming non-interactive media files to at least some of the one or more candidate client devices.

In yet another example, a computer-readable storage medium may store thereon computer-executable instructions that, in response to execution, cause a load balancing system to perform operations, including determining one or more client devices to stream non-interactive media files among multiple client devices connected to a game server when resource usage of the game server exceeds a predetermined threshold, and streaming the non-interactive media files to the determined one or more client devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
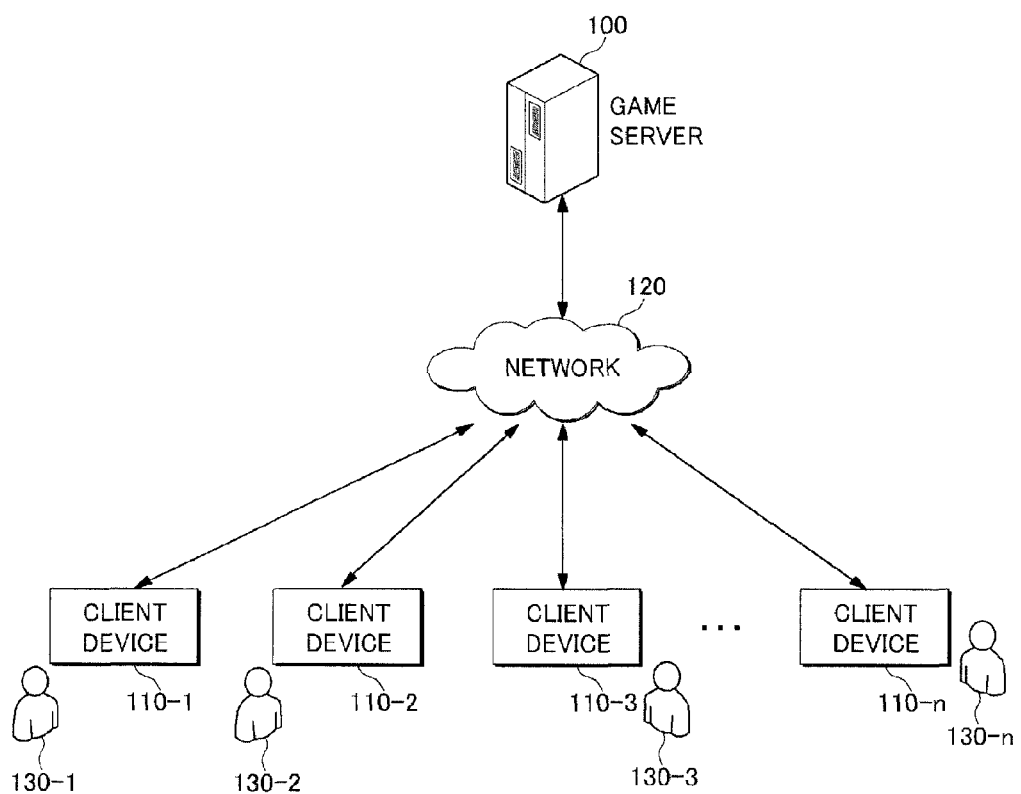
FIG. 1 schematically shows an illustrative example of a cloud-based game system in which multiple client devices are connected to a game server providing a cloud-based game service over a network, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a load balancing scheme for a cloud-based game system.

Technologies are generally described for a cloud-based game system in which a game server provides a cloud-based game service to multiple client devices over a network. In some examples, when too many client devices access the same game server simultaneously, the processing load imposed on the game server may be more than the game server can bear. In such cases, the game server may provide or stream non-interactive media files, such as, for example, non-interactive video files and non-interactive audio files, to at least some of the multiple client devices connected to the game server. Since streaming of the non-interactive media files does not require as much processing power as providing actual interactive gaming files, the streaming of the non-interactive media files may lower the overall processing load for the game server.

In some examples, the game server may determine or identify one or more client devices to which to stream the non-interactive media files from among the multiple client devices connected to the game server, when resource usage of the game server exceeds a predetermined threshold. More particularly, for a variety of reasons including some related to maintaining a high quality of experience for users, the game server may determine or identify one or more candidate client devices in each of which a predetermined game event is about to happen. The predetermined game event may be associated with at least one of starting the game, entering a new stage or a new place in the game, completing a mission in the game, obtaining a game item, meeting or making a talk with another character, or some other predefined game milestones. Then, the game server may determine or identify the one or more client devices to which to stream the non-interactive media files among the candidate client devices, and may stream the non-interactive media files to the determined or identified client devices upon occurrence of the predetermined game event.

For example, when a user plays a fighting game provided by a cloud-based game server, a game character operated by the user via the users device may enter a room, meet an enemy character, and start a fight with the enemy character. When resources of the game server are sufficient, the game may proceed and the game character operated by the user via the user's device may fight with the enemy character. On the other hand, when the resources of the game server are not sufficient to meet the imposed processing load, the user's device may instead receive and play a movie (which is a non-interactive media file provided or streamed by the game server to the user's device) in which, for example, the game character otherwise operated by the user via the user's device meets and makes conversation with the enemy, rather than proceeding with the game at its most recent interactive point. Thus, the fighting may begin after the completion of the playing of the non-interactive movie on the user's device.

FIG. 1 schematically shows an illustrative example of a cloud-based game system in which multiple client devices are connected to a game server providing a cloud-based game service over a network, arranged in accordance with at least some embodiments described herein.

As depicted in FIG. 1, a game server 100 may provide a cloud-based game service to multiple client devices 110-1, 110-2, 110-3, . . . , 110-n over a network 120. Examples of client devices 110-1, 110-2, 110-3, . . . , 110-n may include, but are not limited to, a mobile phone, a smartphone, a personal digital assistant (PDA), a tablet, a mobile game console, a laptop computer, a desktop computer, or any other devices having communication capability.

In some embodiments, game server 100 may monitor or measure resource usage thereof by, for example, a resource usage measurement unit. In some embodiments, the resource usage may be associated with resource usage of a central processing unit (CPU) of game server 100, resource usage of a graphic processing unit (GPU) of game server 100, resource usage of a main memory of game server 100, and/or resource usage of a graphic memory of game server 100, etc.

In some embodiments, game server 100 may compare the measured resource usage with a predetermined threshold by, for example, the resource usage measurement unit. In some embodiments, the predetermined threshold may be associated with processing power of game server 100. By way of example, but not limitation, the processing power may be associated with processing power of the central processing unit (CPU), processing power of the graphic processing unit (GPU), capacity of the main memory, and/or capacity of the graphic memory, etc.

In some embodiments, game server 100 may determine or identify one or more client devices to which to stream non-interactive media files among client devices 110-1, 110-2, 110-3, . . . , 110-n, when the resource usage is determined to exceed the predetermined threshold, by, for example, a determination unit. By way of example, but not limitation, the non-interactive media files may be non-interactive video files, non-interactive audio files, non-interactive image files, non-interactive text files, or any other media files that game server 100 may have only to stream to the client devices without performing a complicated processing such as, for example, a rendering process.

In some embodiments, game server 100 may determine or identify, among client devices 110-1, 110-2, 110-3, . . . , 110-n, one or more candidate client devices in each of which a predetermined game event is about to happen, when the resource usage is determined to exceed the predetermined threshold, by, for example, the determination unit. Examples of the predetermined game event may include, but are not limited to, starting a game by a player of the game, entering a new stage in the game by the player, entering a new place in the game by the player, completing a mission in the game by the player, obtaining a game item by the player, meeting another character in the game by the player, making a talk with another character in the game by the player, occurrence of a scene change in the game, any other pre-defined game-related events or milestones, or even suspension of the game at a point intended to avoid disrupting the high quality of experience for the user. For example, in the example illustrated in FIG. 1, it may be assumed that a user of client device 110-1, i.e., a player 130-1, is about to enter a new stage in the game; a user of client device 110-2, i.e., a player 130-2, is about to complete a mission in the game; and a user of client device 110-3, i.e., a player 130-3, is about to obtain a new game item. In such cases, game server 100 may determine or identify client devices 110-1, 110-2 and 110-3 as the candidate client devices to which to stream non-interactive media files to reduce the processing load imposed upon game server 100.

In some embodiments, game server 100 may determine or identify the one or more client devices to stream the non-interactive media files among the one or more candidate client devices by, for example, the determination unit. In some embodiments, game server 100 may determine or identify the one or more client devices to which to stream the non-interactive media files by taking into consideration the available processing power of game server 100, such as, for example, the processing power of the central processing unit (CPU), the processing power of the graphic processing unit (GPU), the capacity of the main memory, and/or the capacity of the graphic memory. For example, in the example illustrated in FIG. 1, game server 100 may determine that it is necessary to stream the non-interactive media files to just two client devices among three candidate client devices 110-1, 110-2 and 110-3, in light of the processing power of game server 100 and the measured resource usage of game server 100.

In some embodiments, game server 100 may randomly determine or identify the one or more client devices to which to stream the non-interactive media files among the candidate client devices. In alternative embodiments, game server 100 may determine or identify the one or more client devices to which to stream the non-interactive media files based at least in part on number of non-interactive media file streamings for each of the one or more candidate client devices. For example, in the example illustrated in FIG. 1, when game server 100 has previously provided or streamed the non-interactive media files twice to client device 110-1, five times to client device 110-2, and ten times to client device 110-3, game server 100 may determine to stream the non-interactive media files to client devices 110-1 and 110-2 upon occurrence of the predetermined game event, in an attempt to distribute delays or other processing burdens amongst the client devices in an equitable manner.

The processing load of game server 100 may be reduced by streaming the non-interactive media files to some of client devices 110-1, 110-2, 110-3, . . . , 110-n, since the streaming of the non-interactive media files may use less resources of game server 100 than providing game playing, which requires a complicated graphic processing, such as rendering.

Figure 2:
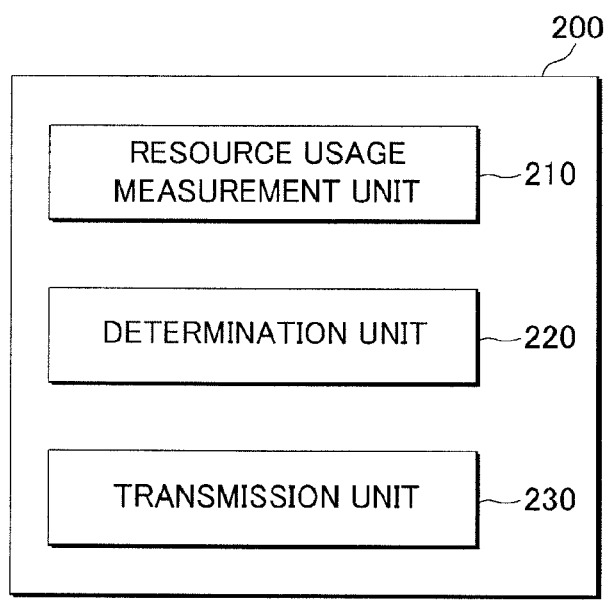
FIG. 2 shows a schematic block diagram illustrating an example architecture for providing a load balancing scheme for a cloud-based game system, arranged in accordance with at least some embodiments described herein.

FIG. 2 shows a schematic block diagram illustrating an example architecture for providing a load balancing scheme for a cloud-based game system, arranged in accordance with at least some embodiments described herein.

As depicted, a load balancing system 200 may include a resource usage measurement unit 210, a determination unit 220, and a transmission unit 230. Although illustrated as discrete components, various components may be divided into additional components, combined into fewer components, or eliminated altogether while being contemplated within the scope of the disclosed subject matter.

Resource usage measurement unit 210 may be configured to measure resource usage of a game server (e.g., game server 100). By way of example, but not limitation, the resource usage of the game server may be associated with resource usage of a central processing unit (CPU) of the game server, resource usage of a graphic processing unit (GPU) of the game server, resource usage of a main memory of the game server, and/or resource usage of a graphic memory of the game server, etc.

Determination unit 220 may be configured to determine or identify one or more client devices to which to stream non-interactive media files among multiple client devices connected to the game server (e.g., client devices 110-1, 110-2, 110-3, . . . , 110-n), based at least in part on the resource usage measured by resource usage measurement unit 210. In some embodiments, determination unit 220 may compare the resource usage measured by resource usage measurement unit 210 with a predetermined threshold. By way of example, but not limitation, the predetermined threshold may be associated with processing power of the game server, such as, for example, processing power of the central processing unit (CPU), processing power of the graphic processing unit (GPU), capacity of the main memory, and/or capacity of the graphic memory, etc.

In some embodiments, determination unit 220 may determine or identify, among the multiple client devices connected to the game server, one or more candidate client devices in each of which a predetermined game event is about to happen, when the resource usage of or corresponding to the game server is determined to exceed the predetermined threshold. Examples of the predetermined game event may include, but are not limited to, starting a game by a player of the game, entering a new stage in the game by the player, entering a new place in the game by the player, completing a mission in the game by the player, obtaining a game item by the player, meeting another character in the game by the player, making a talk with another character in the game by the player, occurrence of a scene change in the game, and any other events, suspension of the game upon occurrence of which may not make the player feel intensely irritated.

In some embodiments, determination unit 220 may determine or identify the one or more client devices to stream the non-interactive media files among the candidate client devices. In some embodiments, determination unit 220 may determine or identify the one or more client devices to stream the non-interactive media files based at least in part on processing power of the game server, such as, for example, the processing power of the central processing unit (CPU), the processing power of the graphic processing unit (GPU), the capacity of the main memory, and/or the capacity of the graphic memory, etc.

In some embodiments, determination unit 220 may randomly determine or identify the one or more client devices to which to stream the non-interactive media files among the candidate client devices. In alternative embodiments, determination unit 220 may determine or identify the one or more client devices to which to stream the non-interactive media files based at least in part on number of previous non-interactive media file streamings for each of the candidate client devices, in an attempt to distribute delays or other processing burdens amongst the client devices in an equitable manner.

Transmission unit 230 may be configured to transmit or stream the non-interactive media files to the client devices determined by determination unit 220, upon occurrence of the predetermined game event. The processing load of the game server may be reduced by streaming the non-interactive media files to some of the client devices, since the streaming of the non-interactive media files may use less resources of the game server than providing game playing, which requires a complicated graphic processing, such as rendering.

Figure 3:
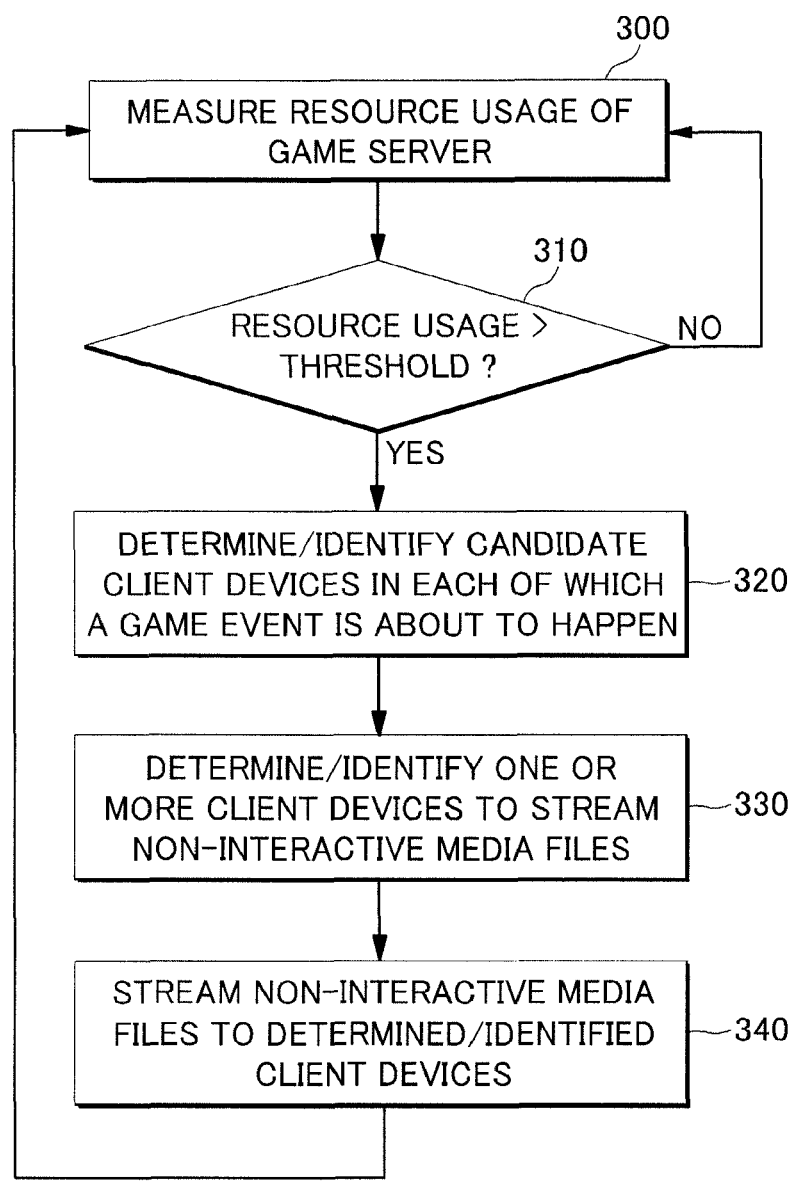
FIG. 3 shows an example flow diagram of a process for providing a load balancing scheme for a cloud-based game system, arranged in accordance with at least some embodiments described herein.

FIG. 3 shows an example flow diagram of a process for providing a load balancing scheme for a cloud-based game system, arranged in accordance with at least some embodiments described herein.

The process in FIG. 3 may be implemented in a game server such as game server 100 and/or a load balancing system such as load balancing system 200 including resource usage measurement unit 210, determination unit 220 and transmission unit 230 described above. An example process may include one or more operations, actions, or functions as illustrated by one or more blocks 300, 310, 320, 330 and/or 340. Although illustrated as discrete blocks, various blocks may be divided into additional blocks, combined into fewer blocks, or eliminated, depending on the desired implementation. Processing may begin at block 300.

At block 300, the game server or the load balancing system may measure resource usage of the game server. By way of example, but not limitation, the resource usage of the game server may be associated with resource usage of a central processing unit (CPU) of the game server, resource usage of a graphic processing unit (GPU) of the game server, resource usage of a main memory of the game server, and/or resource usage of a graphic memory of the game server, etc. Processing may continue from block 300 to block 310.

At block 310, the game server or the load balancing system may compare the measured resource usage with a predetermined threshold. By way of example, but not limitation, the predetermined threshold may be associated with processing power of the game server, such as, for example, processing power of the central processing unit (CPU), processing power of the graphic processing unit (GPU), capacity of the main memory, and/or capacity of the graphic memory, etc. If the measured resource usage exceeds the predetermined threshold (YES), processing may continue from block 310 to block 320. Otherwise, processing may return to block 300.

At block 320, the game server or the load balancing system may determine or identify, among multiple client devices connected to the game server, one or more candidate client devices in each of which a predetermined game event is about to happen. Examples of the predetermined game event may include, but are not limited to, starting a game by a player of the game, entering a new stage in the game by the player, entering a new place in the game by the player, completing a mission in the game by the player, obtaining a game item by the player, meeting another character in the game by the player, making a talk with another character in the game by the player, occurrence of a scene change in the game, and any other game milestones, including suspension of the game at a time intended to reduce any disruption of the quality of experience for the user. Processing may continue from block 320 to block 330.

At block 330, the game server or the load balancing system may determine or identify one or more client devices to which to stream non-interactive media files among the one or more candidate client devices. In some embodiments, the game server or the load balancing system may determine or identify the one or more client devices to which to stream the non-interactive media files based at least in part on processing power of the game server. In some embodiments, the game server or the load balancing system may randomly determine or identify the one or more client devices to which to stream the non-interactive media files among the candidate client devices. In alternative embodiments, the game server or the load balancing system may select the one or more client devices to which to stream the non-interactive media files based at least in part on number of previous non-interactive media file streamings for each of the one or more candidate client devices, in an attempt to distribute delays or other processing burdens amongst the client devices in an equitable manner. Processing may continue from block 330 to block 340.

At block 340, the game server or the load balancing system may transmit or stream the non-interactive media files to the determined or identified client devices. Processing may continue from block 340 to block 300. Since streaming of the non-interactive media files does not require as much processing power as providing actual interactive gaming files, the streaming of the non-interactive media files may lower the overall processing load for the game server.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
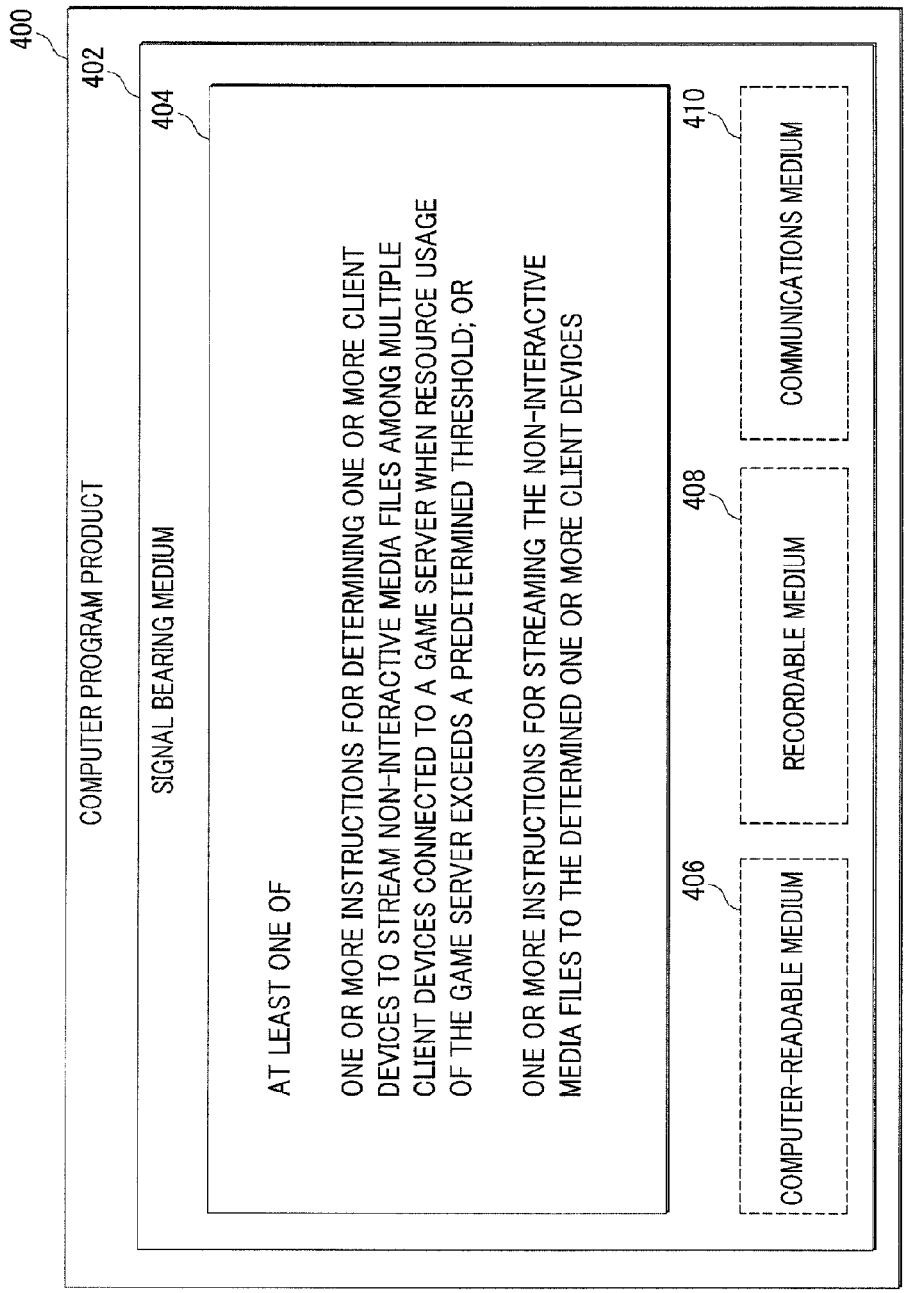
FIG. 4 illustrates computer program products that may be utilized to provide a load balancing scheme for a cloud-based game system, arranged in accordance with at least some embodiments described herein.

FIG. 4 illustrates computer program products that may be utilized to provide a load balancing scheme for a cloud-based game system, arranged in accordance with at least some embodiments described herein.

Program product 400 may include a signal bearing medium 402. Signal bearing medium 402 may include one or more instructions 404 that, when executed by, for example, a processor, may provide the functionality described above with respect to FIGS. 1-3. By way of example, instructions 404 may include: one or more instructions for determining one or more client devices to stream non-interactive media files among multiple client devices connected to a game server when resource usage of the game server exceeds a predetermined threshold; one or more instructions for streaming the non-interactive media files to the determined one or more client devices. Thus, for example, referring to FIG. 2, load balancing system 200 may undertake one or more of the blocks shown in FIG. 3 in response to instructions 404.

In some implementations, signal bearing medium 402 may encompass a computer-readable medium 406, such as, but not limited to, a hard disk drive, a CD, a DVD, a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, program product 400 may be conveyed to one or more modules of load balancing system 200 by an RF signal bearing medium 402, where the signal bearing medium 402 is conveyed by a wireless communications medium 410 (e.g., a wireless communications medium conforming with the IEEE 802.11 standard).

Figure 5:
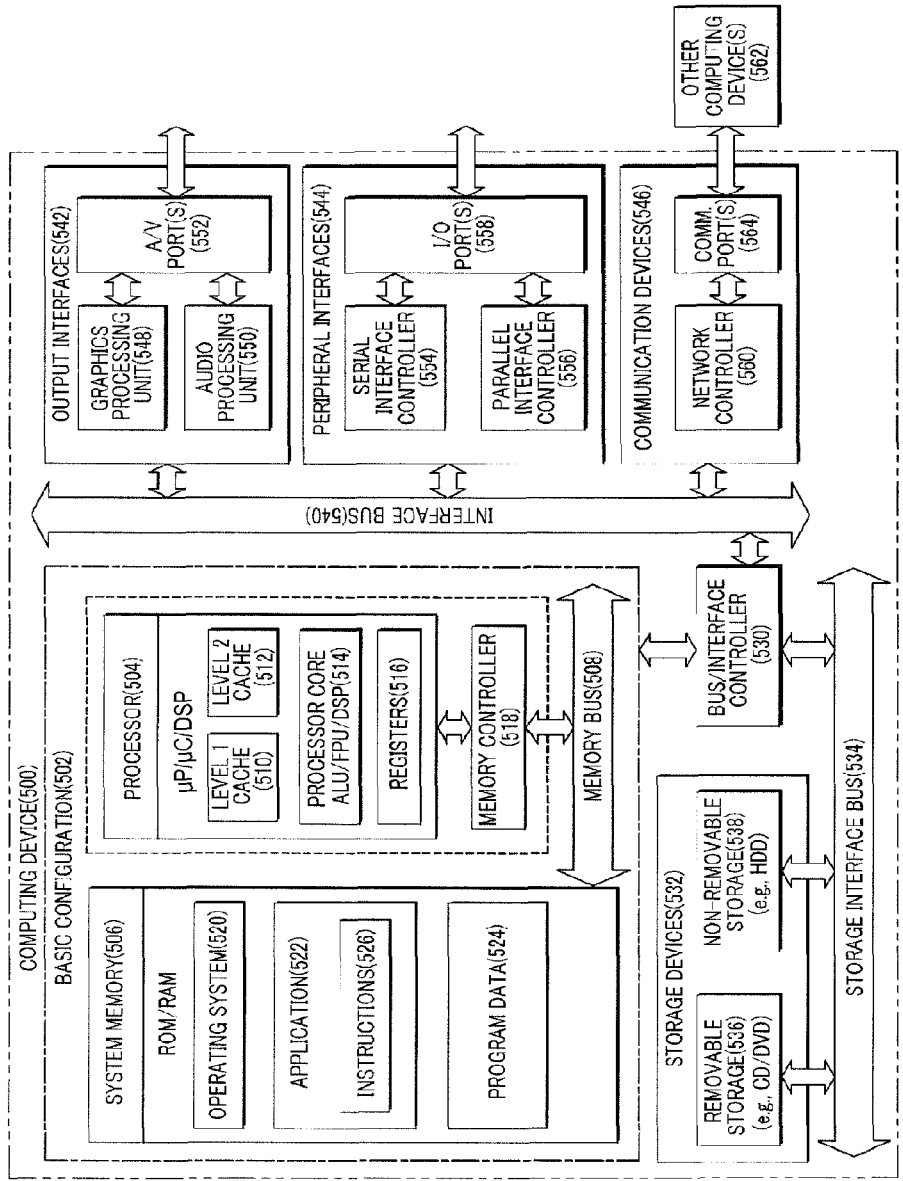
FIG. 5 is a block diagram illustrating an example computing device that may be utilized to provide a load balancing scheme for a cloud-based game system, arranged in accordance with at least some embodiments described herein.

FIG. 5 is a block diagram illustrating an example computing device that may be utilized to provide a load balancing scheme for a cloud-based game system, arranged in accordance with at least some embodiments described herein.

In these examples, elements of computing device 500 may be arranged or configured for a cloud-based game system. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor ($\mu$P), a microcontroller ($\mu$C), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include instructions 526 that may be arranged to perform the functions as described herein including the actions described with respect to the load balancing system 200 architecture as shown in FIG. 2 or including the actions described with respect to the flow charts shown in FIG. 3. In some examples, application 522 may be arranged to operate with program data 524 on an operating system 520 such that implementations for instructions for a load balancing system as described herein.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A load balancing system comprising:
   a resource usage measurement unit configured to measure resource usage of a game server;
   a determination unit configured to:
      compare the measured resource usage with a predetermined threshold, and
      in response to a determination that the measured resource usage exceeds the predetermined threshold, determine that a predetermined game event is about to happen in one or more client devices among a plurality of client devices connected to the game server; and
   a transmission unit configured to stream non-interactive media files to the one or more client devices upon occurrence of the predetermined game event.

2. The load balancing system of claim 1, wherein the resource usage of the game server is associated with at least one of resource usage of a central processing unit (CPU) of the game server, resource usage of a graphic processing unit (GPU) of the game server, resource usage of a main memory of the game server, and resource usage of a graphic memory of the game server.

3. The load balancing system of claim 1, wherein the predetermined threshold is associated with processing power of the game server.

4. The load balancing system of claim 3, wherein the processing power of the game server is associated with at least one of processing power of a central processing unit (CPU) of the game server, processing power of a graphic processing unit (GPU) of the game server, capacity of a main memory of the game server, and capacity of a graphic memory of the game server.

5. The load balancing system of claim 1, wherein the predetermined game event is associated with at least one of starting a game by a player of the game, entering a new stage in the game by the player, entering a new place in the game by the player, completing a mission in the game by the player, obtaining a game item by the player, meeting another character in the game by the player, making a talk with the another character in the game by the player, and occurrence of a scene change in the game.

6. The load balancing system of claim 1, wherein the determination unit is further configured to select the one or more client devices to stream the non-interactive media files among one or more candidate client devices based at least in part on processing power of the game server.

7. The load balancing system of claim 6, wherein the processing power of the game server is associated with at least one of processing power of a central processing unit (CPU) of the game server, processing power of a graphic processing unit (GPU) of the game server, capacity of a main memory of the game server, and capacity of a graphic memory of the game server.

8. The load balancing system of claim 1, wherein the determination unit is further configured to randomly select the one or more client devices to which to stream the non-interactive media files.

9. The load balancing system of claim 1, wherein the determination unit is further configured to select the one or more client devices to which to stream the non-interactive media files based at least in part on number of media file streamings for each of the one or more candidate client devices.

10. The load balancing system of claim 1, wherein the non-interactive media files includes at least one of non-interactive video files, non-interactive audio files, non-interactive image files and non-interactive text files.

11. The load balancing system of claim 1, wherein an amount of resource usage of the game server by the non-interactive media files is less than an amount of resource usage of the game server by certain media files, the certain media files associated with one or more predetermined game events that are about to happen in the one or more client devices.

12. A method performed under control of a game server, comprising:
   measuring resource usage of the game server;
   comparing the measured resource usage with a predetermined threshold;
   in response to a determination that the measured resource usage exceeds the predetermined threshold, determining that a predetermined game event is about to happen in one or more candidate devices among a plurality of client devices connected to the game server; and
   streaming non-interactive media files to at least some of the one or more candidate client devices.

13. The method of claim 12, wherein the resource usage of the game server is associated with at least one of resource usage of a central processing unit (CPU) of the game server, resource usage of a graphic processing unit (GPU) of the game server, resource usage of a main memory of the game server, and resource usage of a graphic memory of the game server.

14. The method of claim 12, wherein the predetermined threshold is associated with processing power of the game server.

15. The method of claim 12, wherein the predetermined game event is associated with at least one of starting a game by a player of the game, entering a new stage in the game by the player, entering a new place in the game by the player, completing a mission in the game by the player, obtaining a game item by the player, meeting another character in the game by the player, making a talk with the another character in the game by the player, and occurrence of a scene change in the game.

16. The method of claim 12, further comprising:
selecting the at least some of the one or more candidate client devices to stream the non-interactive media files.

17. The method of claim 16, wherein the selecting includes selecting the at least some of the one or more candidate client devices based at least in part on processing power of the game server.

18. The method of claim 16, wherein the selecting includes selecting the at least some of the one or more candidate client devices randomly.

19. The method of claim 16, wherein the selecting includes selecting the at least some of the one or more candidate client devices based at least in part on number of non-interactive media file streamings for each of the one or more candidate client devices.

20. The method of claim 12, wherein the non-interactive media files include at least one of non-interactive video files, non-interactive audio files, non-interactive image files and non-interactive text files.

21. A non-transitory computer-readable storage medium having stored thereon computer-executable instructions that, in response to execution, cause a load balancing system to perform operations, comprising:
measuring resource usage of a game server;
in response to a determination that the measured resource usage exceeds a predetermined threshold, determining that a predetermined event is about to happen in one or more client devices among a plurality of client devices connected to the game server; and
streaming non-interactive media files to the one or more client devices.

22. The non-transitory computer-readable storage medium of claim 21, wherein the resource usage of the game server is associated with at least one of resource usage of a central processing unit (CPU) of the game server, resource usage of a graphic processing unit (GPU) of the game server, resource usage of a main memory of the game server, and resource usage of a graphic memory of the game server.

23. The non-transitory computer-readable storage medium of claim 21, wherein the predetermined threshold is associated with processing power of the game server.

24. The non-transitory computer-readable storage medium of claim 23, wherein the processing power of the game server is associated with at least one of processing power of a central processing unit (CPU) of the game server, processing power of a graphic processing unit (GPU) of the game server, capacity of a main memory of the game server, and capacity of a graphic memory of the game server.

25. The non-transitory computer-readable storage medium of claim 21, wherein the determining includes:
selecting the one or more client devices to stream the non-interactive media files, among the one or more candidate client devices, based at least in part on processing power of the game server.

26. The non-transitory computer-readable storage medium of claim 25, wherein the predetermined game event is associated with at least one of starting a game by a player of the game, entering a new stage in the game by the player, entering a new place in the game by the player, completing a mission in the game by the player, obtaining a game item by the player, meeting another character in the game by the player, making a talk with another character in the game by the player, and occurrence of a scene change in the game.

27. The non-transitory computer-readable storage medium of claim 25, wherein the processing power of the game server is associated with at least one of processing power of a central processing unit (CPU) of the game server, processing power of a graphic processing unit (GPU) of the game server, capacity of a main memory of the game server, and capacity of a graphic memory of the game server.

28. The non-transitory computer-readable storage medium of claim 21, wherein the non-interactive media files includes at least one of non-interactive video files, non-interactive audio files, non-interactive image files and non-interactive text files.

29. The computer-readable storage medium of claim 21, wherein an amount of resource usage of the game server by the non-interactive media files is less than an amount of resource usage of the game server by certain media files, the certain media files associated with one or more predetermined game events that are about to happen in the one or more client devices.

* * * * *